3,027,856
SEED SOWING APPARATUS
Mogens Dannevig, Kongsvinger, Norway
Filed Oct. 30, 1959, Ser. No. 849,934
Claims priority, application Norway Nov. 3, 1958
6 Claims. (Cl. 111—95)

The present invention relates to a seed sowing apparatus, in particular to an apparatus adapted for the sowing of the seed of conferous trees, of the type comprising a hollow sowing rod which serves as a seed container and which supplies seed to a sowing mechanism associated with the rod.

It is an object of the invention to provide a seed sowing apparatus having an improved sowing mechanism capable of forming a suitably deep and wide seed receiving furrow in the earth merely by pushing the sowing rod with the sowing mechanism into the earth and incline the rod forwardly, the seed being released and dropped into the seed furrow formed by the rod when the rod arrives in a position wherein the rod axis is under a predetermined angle to the surface of the earth into which the rod has been pushed.

It is a further object of the invention to provide a seed sowing apparatus which is provided with a device adapted to remove a layer of raw humus on top of the earth. One of the most important reasons for the difficulties involved in the sowing of coniferous seed is that the top layer of the earth, the so-called raw humus layer, often is too thick. For the purpose of overcoming this unfavorable condition of the seed receiving earth, the seed sowing apparatus according to the invention is provided with a detachable scraper which is adapted to perform such a movement that the raw humus layer referred to is removed during the formation of the sowing furrow.

An essential feature of the seed sowing appartus according to the invention consists in that the seed sowing mechanism is in the form of a hollow tube having at its lower end a cutting member, the said tube being pivotably connected to a push rod provided with an abutment member limiting the depth to which the rod may be pushed into the earth.

The invention will now be more fully described in connection with the accompanying drawings which show an embodiment of the invention. In the drawing:

FIGURE 3 is an elevational view of the apparatus as seen from the left in FIGURE 1 but with the support rod removed to permit a clearer showing of the remaining parts.

Figure 1:
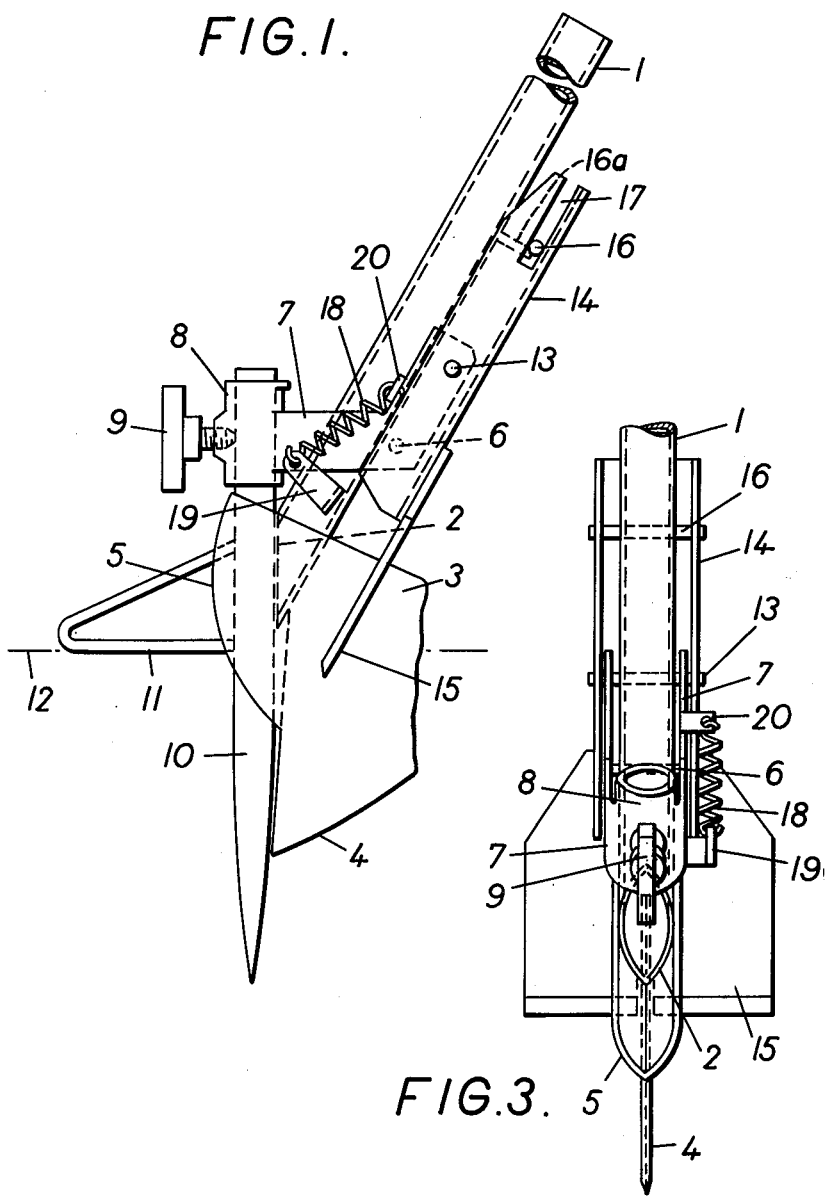
FIGURE 1 is a side elevational view of the apparatus, in the position adopted at the initiation of pushing the rod into the earth.

In the drawing, 1 is the lower end of the tube forming the seed container. At the top end this tube is secured to a stick, not shown, of a length suitable to make the stick convenient to carry in the hand, in a manner similar to that of a ski stick. The lower end of the tube 1 is cut at 2 along a line running obliquely to the axis of the tube. On the "back" side of the lower end of the tube, i.e. the side opposite to the oblique opening 2, a plow including a plow blade 3 is secured. The plow blade 3 is provided with a sharp edge 4 remotely from the tube 1 and is, at the opposite edge provided with a pair of wings 5, one to either side of the lower end of the tube 1.

At a short distance above the plow blade 3, the tube 1 is provided with a pivot 6 by means of which it is swingably mounted on a bracket 7 including a mounting sleeve 8 having a set screw 9 threaded radially through its wall for positioning engagement with the pointed support rod 10. The axial position of the bracket may be adjusted on the push rod by means of the set screw 9. Welded or in other suitable manner secured to the rod 10 is a transversely projecting stop element 11 serving as a limiting member to determine the depth to which the rod may be pushed into the earth. The earth surface is indicated by the line 12 in FIGURES 1 and 2. The circumferential surface of the rod 10 is so shaped adjacent to the material around the mouth of discharge opening 2 of the tube 1 as to completely cover and close such opening in the position of the apparatus shown in FIGURE 1, for the purpose of preventing earth from entering such opening when the rod 10 is pushed into the earth.

The bracket arms 7 are extended upwardly at an angle beyond the said pivot 6 and carry at their end a pivot 13 carrying a pair of levers 14 supporting between them a plate like bifurcated scraper member 15 extending in a plane substantially at right angles to the plane of the plow blade 3 and to either side of the latter with the plow blade movably received between its furcations, as shown in FIGURE 3. At the top end the levers 14 are formed with opposed parallel slots 17 slidably receiving a pin 16 fixedly supported on the tube 1 in spaced relation therefrom, as by the support number 16a and engaging a slot 17 extending longitudinally of the levers 14 at their top end. The scraper member 15 is at the lower, horizontal edge provided with a sharp edge, so as to facilitate the entering of the same into the top layer of the earth when the rod 10 is pushed into the earth.

Figure 2:
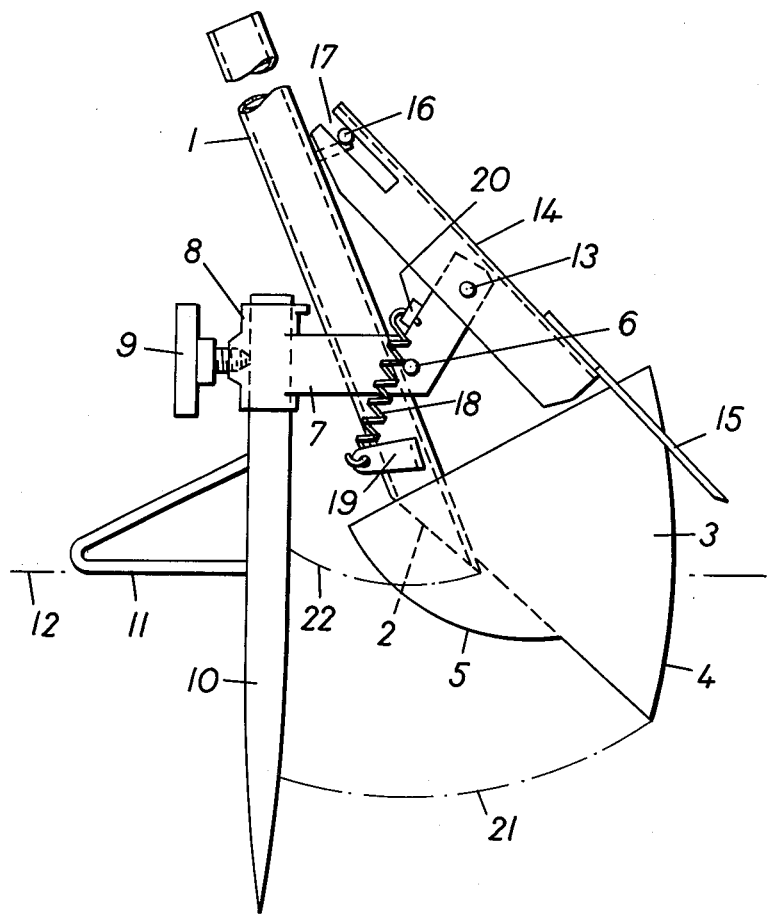
FIGURE 2 is a similar view but with the apparatus in operative position for sowing.

A tension spring member 18 is arranged between brackets 19 and 20 secured to the tube 1 and the arms 7, respectively, for the purpose of returning and maintaining the parts in closed position as shown in FIGURE 1.

In operation thestick mounted on top of the tube 1 is carried in the hand of the operator. At the point in which a seed is to be sowed, the rod 10 is pushed into the earth, FIGURE 1, the stick is manually tilted or swung about the pivot 6, thereby through its connection 16, 17 with the lever 14, swinging the latter about pivot 13 and making the plow blade 3 perform a cutting movement along the circle arc indicated at 21 and also causing the scraper member 15 to perform a scraping movement about the pivotal axis 13. Thus a furrow is ploughed by means of the blade 3 while the scraper member 15 pushes away the top, raw humus layer of the earth so as to clear away this layer where it might otherwise obstruct the lower end tip of the opening 2 of the tube 1 and thereby permit free discharge of seeds from the discharge opening 2 of the tube to virginial earth underneath such raw humus layer. In other words, by the tilting movement of the blade 3 etc. away from the rod 10, the opening 2 of the tube is also uncovered, to the effect that a seed contained in the tube 1 is released and dropped into the furrow prepared by the blade 3.

During subsequent withdrawal of the rod 10 from the earth, the spring member 18 returns the parts to the closed position shown in FIGURE 1, whereby the opening 2 is covered and all parts are prepared for a new seed sowing operation.

As will be apparent, the scraper member 15 is easily mountable and demountable for renewal or removal. Further, due to the angle form of the bracket arms 7, and the relative location of pivots 16 and 13 the scraper member 15 will, incident to the tilting movement of the tube 1 about the pivot 6, perform a swinging movement in advance of and through a greater angle than the movement of the blade 3, to the effect that the raw humus layer is removed in front of the edge 4 of the blade 3 so as to facilitate the movement of the latter. Also the scraper 15 obviously removes soil which might otherwise adhere to and interfere with the operation of the blade 3.

I claim:
1. Seed sowing apparatus of the class described comprising a rigid support rod having the lower end adapted for insertion in a lengthwise direction in the soil, a hollow seed tube, means pivotally connecting said tube to said rod at a location spaced from said rod and above its lower end for swinging movement of the lower end of said tube in the plane of said rod into and from engagement with said rod, said tube having a discharge opening in its lower end directed toward said rod, said rod being adapted to engage said tube around its discharge opening to thus close said opening, a plow including a blade fixedly carried at the lower end of said tube in the plane of swinging movement thereof and on the remote side of said tube from the rod, a bifurcated scraper having portions depending and movable on opposite sides of said plow blade, means pivotally supporting said scraper from said rod for swinging movement in planes parallel to the axial plane of said tube and along said blade, and means interconnecting the scraper and said tube to move said scraper along said blade incident to swinging movement of said tube.

2. Seed sowing apparatus as defined in claim 1 including wing-like projections on said plow extending on opposite sides of said tube and said rod to prevent the movement of soil into obstructing relation with respect to said discharge opening during swinging of lower end of said tube away from said rod.

3. Seed sowing apparatus as defined in claim 1 including a depth defining stop secured on and projecting transversely from said rod for engagement with the surface of the soil to limit the depth of penetration thereof by said rod.

4. Seed sowing apparatus as defined in claim 1 wherein said means pivotally connecting said tube to said rod and said means pivotally supporting the scraper include a bracket secured to and projecting to one side of said rod, said scraper and said tube being both pivoted to said bracket, said bracket being adjustable to various positions along said rod, and a fixed transverse projection on said rod for limiting the extent of its insertion into the soil.

5. Seed sowing apparatus of the class described comprising a rigid support rod having a lower end adapted for insertion in a lengthwise direction into the soil, a hollow seed tube, means pivotally connecting said tube to said rod at a location spaced from said rod and above its lower end for swinging movement of the lower end of said tube in the plane of said rod into and from engagement with said rod, said tube having a discharge opening adjacent its lower end directed toward said rod, said rod being adapted to engage said tube around its discharge opening to thus close said opening, a scraper having an operative edge normally depending below and adjacent to the discharge end of said tube on the opposite side thereof from said rod, means pivotally supporting the scraper from said rod for swinging movement in planes parallel to the axial plane of said tube and along said blade, and movement magnifying means transmitting swinging movement from said tube to the scraper to swing said scraper away from the rod in advance of the tube and through a greater arc than the tube.

6. The combination as defined in claim 5 including a retraction spring interconnected between said tube and its said bracket for resiliently urging the tube toward a position wherein its discharge opening is closed by said rod.

References Cited in the file of this patent
UNITED STATES PATENTS
2,865,315     Goldstein _____ Dec. 23, 1958
FOREIGN PATENTS
30,635     France _____ Apr. 20, 1956